(12) United States Patent
Pellerite et al.

(10) Patent No.: US 12,552,896 B2
(45) Date of Patent: Feb. 17, 2026

(54) IONIC COPOLYMER, CURABLE MEMBRANE PRECURSOR COMPOSITION, MEMBRANE COMPOSITION, AND ELECTRONIC DEVICE

(71) Applicant: 3M INNOVATIVE PROPERTIES COMPANY, St. Paul, MN (US)

(72) Inventors: Mark J. Pellerite, Woodbury, MN (US); Claire Hartmann-Thompson, Lake Elmo, MN (US); Marina M. Kaplun, Woodbury, MN (US); Justin P. Meyer, Oakdale, MN (US); John P. Baetzold, North St. Paul, MN (US); James P. DiZio, St. Paul, MN (US); John Christopher Thomas, St. Paul, MN (US); Steven D. Solomonson, Shoreview, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 504 days.

(21) Appl. No.: 17/634,419

(22) PCT Filed: Aug. 6, 2020

(86) PCT No.: PCT/IB2020/057454
§ 371 (c)(1),
(2) Date: Feb. 10, 2022

(87) PCT Pub. No.: WO2021/038342
PCT Pub. Date: Mar. 4, 2021

(65) Prior Publication Data
US 2022/0332887 A1 Oct. 20, 2022

Related U.S. Application Data

(60) Provisional application No. 62/891,056, filed on Aug. 23, 2019.

(51) Int. Cl.
*C08G 61/10* (2006.01)
*C08F 212/08* (2006.01)
(Continued)

(52) U.S. Cl.
CPC ............ *C08G 61/10* (2013.01); *C08F 212/08* (2013.01); *C08G 61/123* (2013.01); *C25B 13/08* (2013.01);
(Continued)

(58) Field of Classification Search
CPC ...... H01M 8/1018–1023; H01M 8/103; C08G 61/00–02; C08G 61/04–10;
(Continued)

(56) References Cited

U.S. PATENT DOCUMENTS 3,377,303 A 4/1968 Peerman
7,816,477 B2 10/2010 Suwa
(Continued)

FOREIGN PATENT DOCUMENTS

CN 105980418 A 9/2016
CN 107406534 A 11/2017
(Continued)

OTHER PUBLICATIONS

Dakin et al. (2014). "Imidazolium Bromide Derivatives of Brominated Poly(isobutyleneco-para-methylstyrene): Synthesis of Peroxide-Curable Ionomeric Elastomers". Industrial & Engineering Chemistry Research, 2014, vol. 53, 17527-17536. (Year: 2014).*
(Continued)

*Primary Examiner* — Jonathan Crepeau
*Assistant Examiner* — Jacob Buchanan

(57) ABSTRACT

A cationic copolymer comprises the divalent monomer units: wherein: each $Ar^1$ independently represents phenylene; each L independently represents a direct bond or wherein each $R^1$ independently represents an alkyl group
(Continued)

having 1 to 4 carbon atoms, and each $R^2$ independently represents an alkylene group having from 1 to 6 carbon atoms, and each $Z^-$ represents a non-interfering anion; each $Ar^2$ independently represents an optionally substituted divalent aryl ring, with the proviso that if L represents a direct bond, then $Ar^2$ represents an optionally substituted cationic divalent aryl ring accompanied by $Z^-$; each $R^3$ independently represents H or an alkyl group having 1 to 6 carbon atoms; and each D independently represents a direct bond or $Ar^2$, wherein adjacent D and L are not both direct bonds, and wherein if L is a direct bond, then D is $Ar^2$. The cationic copolymer can be free-radially cured and used in a membrane.

9 Claims, 1 Drawing Sheet

(51) Int. Cl.
  *C08G 61/12* (2006.01)
  *C25B 13/08* (2006.01)
  *H01M 8/10* (2016.01)
  *H01M 8/1023* (2016.01)
  *H01M 8/103* (2016.01)

(52) U.S. Cl.
  CPC ......... *H01M 8/1023* (2013.01); *H01M 8/103* (2013.01); *C08J 2325/08* (2013.01); *H01M 2008/1095* (2013.01)

(58) Field of Classification Search
  CPC ......... C08G 61/12; C08G 61/122–123; C25B 1/04; C08F 8/30–32; C08J 5/20–22; C08J 5/2218; C08J 5/2231; C08J 5/2243
  See application file for complete search history.

(56) References Cited

U.S. PATENT DOCUMENTS

| | | | |
|---|---|---|---|
| 2017/0128930 A1* | 5/2017 | Masel | H01M 8/103 |
| 2017/0174800 A1* | 6/2017 | Isomura | H01M 4/8807 |
| 2017/0189898 A1 | 7/2017 | Masel | |

FOREIGN PATENT DOCUMENTS

| | | |
|---|---|---|
| CN | 108884576 A | 11/2018 |
| EP | 3106476 | 12/2016 |
| WO | WO 2017-176598 | 10/2017 |
| WO | WO 2020-121135 | 6/2020 |
| WO | WO 2020-250057 | 12/2020 |
| WO | WO 2020-254930 | 12/2020 |

OTHER PUBLICATIONS

Alfa, "Polyvinylimidazole", URL< http://www.alfa-chemistry.com/polyvinylimidazole-cas-25232-42-2-item-1329.htm>, retrieved from internet on Apr. 6, 2022, 4 pages.
Appel, "Frontiers, Opportunities, and challenger in biochemical and chemical catalysis of $CO_2$ fixation", Chemical Reviews 2013, vol. 113, pp. 6621-6658.
Costentin, "Catalysis of the electrochemical reduction of carbon dioxide", Chem. Soc. Rev., 2013, vol. 42, pp. 2423-2436.
Di Meglio, "Selective conversion of $CO_2$ to CO with high efficiency using an inexpensive bismuth-based electrocatalyst", J. Am. Chem. Soc., 2013, vol. 135, pp. 8798-8801.
Dubois, "Electrochemical reactions of carbon dioxide", Encyclopedia of Electrochemistry, 2006, vol. 7A, pp. 202-225.
Gattrell, "A review of the aqueous electrochemical reduction of $CO_2$ to hydrocarbons at copper", Journal of electroanalytical chemistry, 2006, vol. 594, pp. 01-19.
Hori, "Electrochemical $CO_2$ reduction on metal electrodes" Modern Aspects of Electrochemistry, 2008, vol. 42, pp. 89-189.
Hugar, "Imidazolium cations with exceptional alkaline stability: A systematic study f structure-stability relationships", J. Am. Chem. Soc., 2015, vol. 137, pp. 8730-8737.
Inglis, "Electrocatalytic pathways towards sustainable fuel production from water and $CO_2$", Coordination chemistry reviews, 2012, vol. 256, pp. 2571-2600.
Kondratenko, "Status and perspectives of $CO_2$ conversion into fuels and chemicals by catalytic, photocatalytic and electrocatalytic processes", Energy Environ. Sci., 2013, vol. 6, pp. 3112-3135.
Kutz, "Sustainion imidazolium-functionalised polymers for carbon dioxide electrolysis", Energy Technology, 2017, vol. 5, pp. 929-936.
Lau, "New insights into the role of imidazolium-based promoters for the electroreduction of $CO_2$ on a silver electrode", J. Am. Chem. Soc., 2016, vol. 138, pp. 7820-7823.
Li, "Novel anion exchange membranes based on polymerizable imidazolium salt for alkaline fuel cell applications", J. Mater. Chem., 2011, vol. 21, pp. 11340-11346.
Lim, "A review on the electrochemical reduction of $CO_2$ in fuel cells, metal electrodes and molecular catalysts", Catalysis Today, 2014, vol. 233, pp. 169-180.
Long, "Hydroxide degradation pathways for imidazolium cations: A DFT study", J. Phys. Chem. C, 2014, vol. 118, pp. 9880-9888.
Ma, "A short review of catalysis for $CO_2$ conversion", Catalysis Today, 2009, vol. 148, pp. 221-231.
Masel, "$CO_2$ conversion to chemicals with emphasis on using renewable energy/resources to drive the conversion", RSC Green Chemistry, No. 43, Royal Society of Chemistry, 2016, pp. 215-257.
Matsubara, "Thermodynamic aspects of electrocatalytic $CO_2$ reduction in acetonitrile and with an ionic liquid as solvent or electrolyte", ACS Catal., 2015, vol. 5, pp. 6440-6452.
Medina-Ramos, "Efficient conversion of $CO_2$ to CO using tin and other inexpensive and easily prepared post-transitions metal catalysts", J. Am. Chem. Soc., 2015, vol. 137, pp. 5021-5027.
Oh, "Ionic liquids enhance the electrochemical $CO_2$ reduction catalyzed by $MoO_2$", Chem. Commun., 2015, vol. 51, pp. 13698-13701.
Qiao, "A review of catalysts for the electroreduction of carbon dioxide to produce low-carbon fuels", Chem. Soc.Rev., 2014, vol. 43, pp. 631-675.
Rosen, "In situ spectroscopic examination of a low overpotential pathway for carbon dioxide conversion to carbon monoxide", J. Phys. Chem. C, 2012, vol. 116, pp. 15307-15312.
Rosen, "Ionic liquid-mediated selective conversion of $CO_2$ to CO at low overpotentials", Science, 2011, vol. 334, pp. 643-644.
Santankrishnan, "Free radical polymerization of N-Vinylimidazole and quaternized vinylimidazole in aqueous solution", Macromolecular Chemistry and Physics, 2013, vol. 214, pp. 1140-1146.
Sun, "Switching the reaction course of electrochemical $CO_2$ reduction with ionic liquids", Langmuir, 2014, vol. 30, pp .6302-6308.
Yang, "Highly alkaline stable N1-alkyl substituted 2-methylimidazolium functionalized alkaline anion exchange membranes", Journal of Materials Chemistry A, 2015, vol. 2, pp. 8559-8565.
Ye, "Relative chemical stability of imidazolium-based alkaline anion exchange polymerized ionic liquids", Macromolecules, 2011, vol. 44, pp. 8494-8503.
Zhou, "Highly selective electrocatalystic reduction of carbon dioxide to carbon monoxide on silver electrode with aqueous ionic liquids", Electrochemistry Communications, 2014, vol. 46, pp. 103-106.
International Search report for PCT International Application No. PCT/IB2020/057454 mailed on Nov. 11, 2020, 4 pages.
Dakin et al., "Imidazolium Bromide Derivatives of Brominated Poly(isobutyleneco-para-methylstyrene): Synthesis of Peroxide-Curable Ionomeric Elastomers", Industrial & Engineering Chemistry Research, 2014, No. 53, pp. 17527-17536.
Wei Li et al., "Novel anion exchange membranes based on polymerizable imidazolium salt for alkaline fuel cell applications", Journal of Materials Chemistry, 2011, No. 21, pp. 11340-11346.

\* cited by examiner

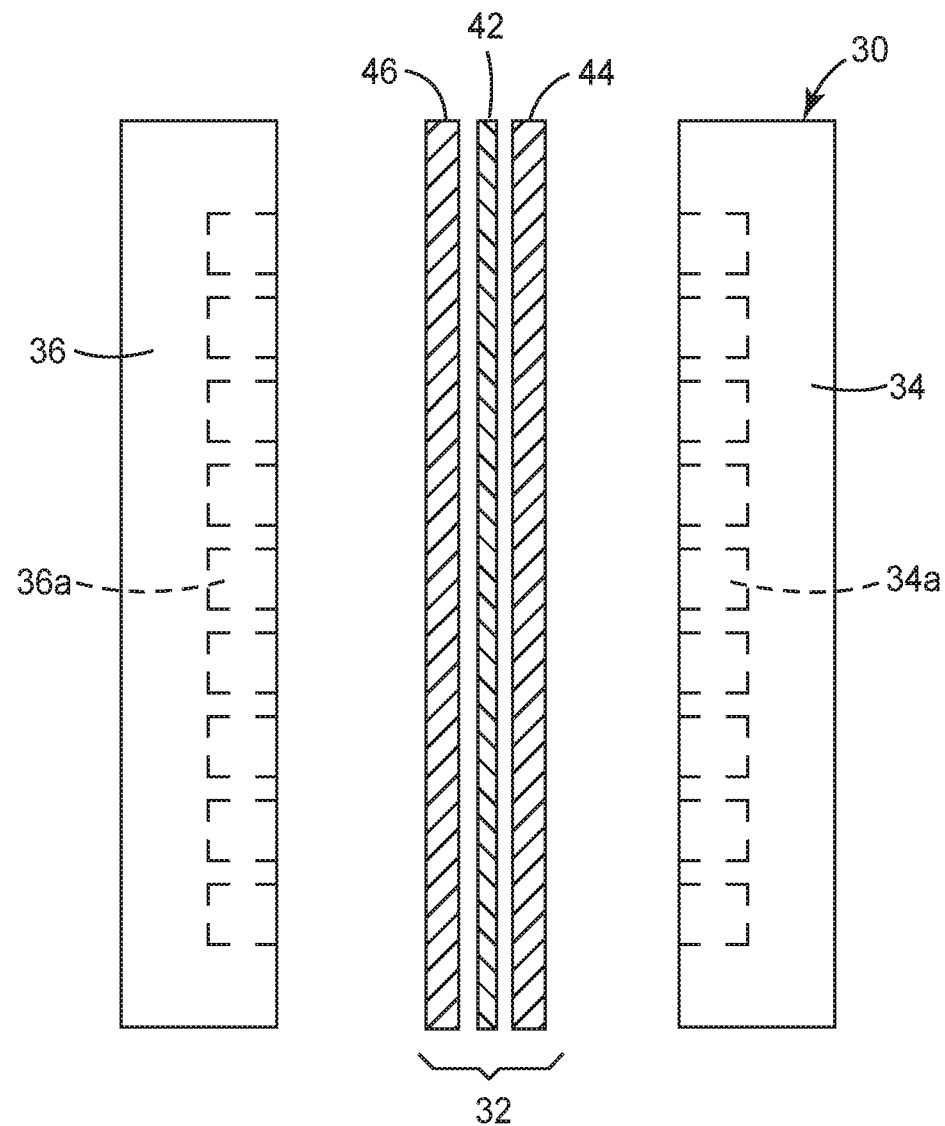

IONIC COPOLYMER, CURABLE MEMBRANE PRECURSOR COMPOSITION, MEMBRANE COMPOSITION, AND ELECTRONIC DEVICE

CROSS-REFERENCE TO RELATED APPLICATIONS

This application is a national stage filing under 35 U.S.C. 371 of PCT/IB2020/057 454, filed Aug. 6, 2020, which claims the benefit of U.S. Provisional Application No. 62/891,056, filed Aug. 23, 2019, the disclosure of which is incorporated by reference in its entirety herein.

GOVERNMENT RIGHTS

This invention was made with Government support under Cooperative Agreement DE-AR0000950 awarded by the U.S. Department of Energy. The U.S. Government may have certain rights in this invention.

BACKGROUND

Anion exchange membranes are useful in various electrochemical cells such as, for example, fuel cells, electrolyzers, batteries, and electrodialysis cells. Previous anion exchange membranes have been prepared from various copolymers having cationic, nitrogen-containing groups. These copolymers have been prepared, for example, by reacting styrene-co-vinylbenzyl chloride copolymers with various nitrogen-containing bases to provide corresponding quaternary ammonium groups. Typical membranes formed in this manner have inadequate mechanical strength for uses such as those described above. For example, the membranes often are brittle and have low tensile strength. Moreover, some membranes are prone to hydrolytic degradation.

SUMMARY

Strength and hydrolytic stability are desirable in anion-exchange membranes used in carbon dioxide or water electrolysis, fuel cells, flow batteries, and similar electrochemical devices. The present disclosure provides ionic copolymers suitable for inclusion in anion-exchange membranes that may overcome the above-referenced deficiencies of prior anion exchange membranes. The present disclosure provides materials and methods of making ionic membranes that have good strength and hydrolytic stability.

In a first aspect, the present disclosure provides a cationic copolymer comprising the divalent monomer units (hereinafter "monomer units"):

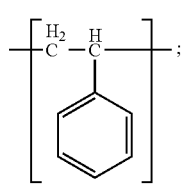
(a)

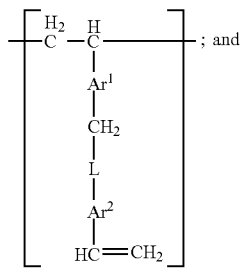
(b)

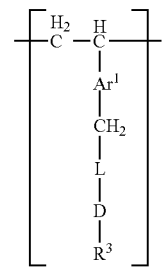
(c)

wherein:
each $Ar^1$ independently represents phenylene;
each L independently represents a direct bond or

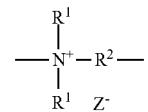

wherein each $R^1$ independently represents an alkyl group having 1 to 4 carbon atoms, and each $R^2$ independently represents an alkylene group having from 1 to 6 carbon atoms, and each $Z^-$ represents a monovalent non-interfering anion;
each $Ar^2$ independently represents an optionally substituted divalent aryl ring, with the proviso that if L represents a direct bond, then $Ar^2$ represents an optionally substituted cationic divalent aryl ring accompanied by $Z^-$;
each $R^3$ independently represents H or an alkyl group having from 1 to 6 carbon atoms; and
each D independently represents a direct bond or $Ar^2$, wherein adjacent D and L are not both direct bonds, and wherein if L is a direct bond, then D is $Ar^2$.

Copolymers according to the present disclosure can be combined with a free-radical initiator to provide a curable membrane precursor composition. The curable membrane precursor compositions can be cured to form membrane compositions.

As used herein:
"aryl ring" refers to a carbocyclic or heterocyclic ring that has 4n+2 pi electrons in the ring;
"direct bond" in reference to a variable group assignment means that the group is absent and the two groups that it connects are directly bonded to each other (e.g., A-B-C where B is a direct bond is equivalent to A-C);
"monomer unit" refers to the largest constitutional unit contributed by a single monomer molecule to the structure of a polymer;
"non-interfering anion" refers to an anion that can form a stable salt with the cationic polymer;

"phenylene" generically refers to a divalent benzene ring; o-phenylene has the formula:

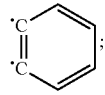

m-phenylene has the formula:

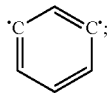

and
p-phenylene has the formula:

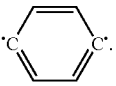

Features and advantages of the present disclosure will be further understood upon consideration of the detailed description as well as the appended claims.

BRIEF DESCRIPTION OF THE DRAWING

FIG. 1 is a schematic exploded side view of an exemplary electrochemical device according to the present disclosure.

DETAILED DESCRIPTION

Ionic copolymers according to the present disclosure can be prepared from corresponding precursor copolymers. The precursor copolymers typically contain monomer units derived from styrene as well as monomer units derived from a vinylbenzyl halide (i.e., a halomethylstyrene), which is usually a vinylbenzyl chloride. Other optional monomer units can be included, if desired; for example, to modify ionic conductivity, solubility, mechanical strength, and swelling characteristics. The precursor copolymer is typically a random copolymer and is often linear.

In some preferred embodiments, the precursor copolymer is a random copolymer formed from styrene and a vinylbenzyl halide such as vinylbenzyl chloride. Such a precursor copolymer has monomer units derived from styrene as in Formula II-1 (below) and monomer units derived from vinylbenzyl halide as in Formula II-2A (below) where X is Cl, Br, or I (preferably Cl) and wherein the —CH$_2$X can be attached to any aromatic ring carbon.

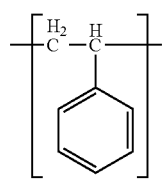

II-1

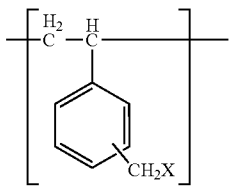

II-2A

The resulting precursor copolymer is usually of Formula III, below.

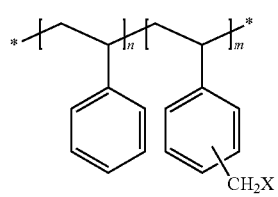

III

In Formula III, the variable n is the mole percentage of monomer units derived from styrene and the variable m is the mole percentage of monomer units derived from vinylbenzyl halide in the precursor copolymer. The monomer units are typically arranged in a random manner. That is, monomer units of the same type are not all together in a block. As used herein in polymer formulas, an asterisk (*) indicates attachment to another group such as, for example, an end group and/or initiator residue.

In some embodiments of the precursor copolymer, the sum of the variables n and m is equal to 100 mole percent. That is, the precursor copolymer contains only two types of monomer units as in Formula (III). The sum of n and m is often at least 80 mole percent, at least 85 mole percent, at least 90 mole percent, at least 95 mole percent, at least 98 mole percent, at least 99 mole percent, at least 99.5 mole percent, at least 99.8 mole percent, or at least 99.9 mole percent based on the total moles of monomer units in the precursor copolymer.

The mole percentage of cationic monomer units derived from vinylbenzyl halide in the precursor copolymer (e.g., monomer units (b) and (c)) is selected to provide a suitable amount of cationic, nitrogen-containing groups in the resultant cationic copolymer. For example, the cationic nitrogen-containing groups may be introduced into cationic copolymer by reaction of nitrogen-containing bases (e.g., tertiary amines, tertiary vinylamines, pyridines. N-vinylimidazole, an N-alkylimidazole, a N,N-dialkylamino-alkylstyrene, a N,N-dialkylaminoalkylbenzene, and combinations thereof) with the monomer units derived from vinylbenzyl halide in the precursor copolymer.

The mole percentage of the cationic monomer units derived from vinylbenzyl halide in the precursor copolymer (e.g., monomer units (b) and (c)) is typically at least 20 mole percent such as, for example, in the range of 20 to 50 mole percent based on the total moles of monomer units in the precursor copolymer, although this is not a requirement. If the amount is greater than 50 mole percent, the final cationic copolymer may be too soluble or swellable in water, a water-based solution, or an electrolyte such as within an electrochemical cell. If the amount is less than 20 mole percent, however, the final cationic copolymer may not have sufficient ionic conductivity. The precursor copolymer typically contains at least 20 mole percent, at least 25 mole percent, at least 30 mole percent, at least 35 mole percent, at least 40 mole percent and up to 50 mole percent, up to 45 mole percent, or up to 40 mole percent monomer units derived from vinylbenzyl halide based on the total moles of monomer units in the precursor copolymer.

When intended for use as a membrane in an electrochemical device, the mole percentage of styrene monomer units in the precursor copolymer, and hence also the resulting cationic copolymer, is chosen such that the cationic copolymer is insoluble in water or a water-based solution, or any electrolyte solution such as that used within the electrochemical device. If the amount is too great, however, there may not be enough cationically charged monomer units (e.g., monomer units (b) and (c)) for the cationic copolymer to be sufficiently ionically conductive. In some preferred embodiments, the precursor copolymer contains at least 50 mole percent such as, for example, 50 to 80 mole percent monomer units derived from styrene based on the total moles of monomer units in the precursor copolymer, however, this is not a requirement. The amount is often at least 50 mole percent, at least 55 mole percent, at least 60 mole percent, at least 65 mole percent, at least 70 mole percent and up to 80 mole percent, up to 75 mole percent, up to 70 mole percent, or up to 65 mole percent based on the total moles of monomer units in the precursor copolymer.

In some embodiments, the precursor copolymer contains 20 to 50 mole percent of monomer units derived from vinylbenzyl halide (e.g., monomer units (b) and (c)) and 50 to 80 mole percent of styrene monomer units (monomer unit (a)) based on the total moles of monomer units in the precursor copolymer. For example, the precursor copolymer may contain 25 to 50 mole percent of monomer units derived from vinylbenzyl halide and 50 to 75 mole percent of styrene monomer units, 30 to 50 mole percent of monomer units derived from vinylbenzyl halide and 50 to 70 mole percent of styrene monomer units, 25 to 45 mole percent of monomer units derived from vinylbenzyl halide and 55 to 75 mole percent of styrene monomer units, 30 to 45 mole percent of monomer units derived from vinylbenzyl halide and 55 to 70 mole percent of monomer units derived from styrene, or 30 to 40 mole percent of monomer units derived from vinylbenzyl halide and 60 to 70 mole percent of monomer units derived from styrene.

The precursor copolymers may be prepared by mixing the monomers with a thermal free-radical initiator (hereinafter "thermal initiator"); for example, according to methods known in the art. Exemplary thermal initiators include azo compounds such as 2,2'-azobis(isobutyronitrile), 2,2'-azobis(2,4-dimethylpentanenitrile), and 2,2'-azobis(2-methylbutyronitrile), and organic peroxides (e.g., benzoyl peroxide and lauroyl peroxide), and mixtures thereof.

The amount of the thermal initiator is typically in a range of 0.01 to 5 weight percent based on a total weight of monomers included in the precursor reaction mixture. The amount can be at least 0.01 weight percent, at least 0.05 weight percent, at least 0.1 weight percent, at least 0.5 weight percent, at least 1 weight percent and up to 5 weight percent, up to 4 weight percent, up to 3 weight percent, up to 2 weight percent, or up to 1 weight percent; however, higher amounts may also be used. The amount of thermal initiator can be used to control the molecular weight. That is, an increase in the amount tends to result in the preparation of a lower molecular weight precursor copolymer.

The polymerization reaction to form the precursor copolymer can occur with or without organic solvent and/or water being present in the reaction mixture. That is, the solids content of the precursor reaction mixture can be up to 100 weight percent. The solids content is equal to the percentage of all components in the precursor reaction mixture that are not an organic solvent and/or water. An organic solvent refers to a non-reactive, organic, liquid component. The organic solvent can be added to lower the viscosity of the precursor reaction mixture, to allow suitable mixing of the components, and to facilitate handling of the final polymeric solution. If the solids content is too low, however, the excess organic solvent and/or water needs to be removed. This adds additional cost and time to the preparation of the precursor copolymer. The solids content is often in a range of 30 to 100 weight percent based on a total weight of the precursor reaction mixture. For example, the solids content can be at least 30 weight percent, at least 40 weight percent, at least 50 weight percent, or at least 60 weight percent and up to 100 weight percent, up to 90 weight percent, up to 80 weight percent, or up to 70 weight percent.

Organic solvent, if added to the precursor reaction mixture, is typically selected based on its ability to form a single phase with the monomers and with the resulting precursor copolymer. The organic solvent can be, for example, a ketone (e.g., acetone, methyl ethyl ketone, methyl iso-butyl ketone, and cyclohexanone), an ester such as an alkyl acetate (e.g., ethyl acetate and butyl acetate), or an aromatic hydrocarbon that optionally can be halogenated (e.g., toluene and chlorobenzene).

The molecular weight (e.g., number average molecular weight, $MW_n$) of the precursor copolymer is typically in a range of 20,000 to 100,000 Daltons, although this is not a requirement. If the weight average molecular weight is below 20,000 Daltons, the cationic copolymer formed from the precursor copolymer may not be sufficiently robust to be used as anion exchange membranes in electrochemical cells. On the other hand, if the weight average molecular weight is greater than 100.000 Daltons, the resulting cationic copolymer solutions may have a viscosity that is too high for easy processing. The weight average molecular weight can be at least 20,000 Daltons, at least 30,000 Daltons, at least 40,000 Daltons, or at least 50,000 Daltons and up to 100,000 Daltons, up to 90,000 Daltons, up to 80,000 Daltons, up to 70,000 Daltons, or up to 60,000 Daltons. For example, the weight average molecular weight can be in a range of 40.000 to 100,000 Daltons, in a range of 40.000 to 80,000 Daltons, in a range of 50,000 to 80,000 Daltons, in a range of 40.000 to 70,000 Daltons, or in a range of 50.000 to 70,000 Daltons.

The cationic copolymer can be formed from the precursor copolymer. More specifically, the precursor copolymer can be reacted with corresponding nitrogen-containing bases (e.g., tertiary amines, pyridines, N-alkylimidazoles), that can nucleophilically displace the benzylic halide to produce monomer units (b) and (c) as corresponding halide salts. The halide anions can be subsequently exchanged with and replaced by other non-interfering monovalent anions that are not reactive with the cationic polymer under normal ambient or intended use conditions. Examples may include other halide ions (e.g., Cl, Br, I), hydroxide, bicarbonate, methanesulfonate, trifluoroacetate, acetate, and nitrate.

Nitrogen-containing bases are typically added to the precursor copolymer in the presence of one or more organic solvents. Water may also be present. The solvent system is selected so that the final product (i.e., the cationic, nitrogen-containing copolymer, which is the cationic copolymer) is dissolved. The solvent system may or may not dissolve the precursor copolymer. That is, the initial reaction mixture can be either a solution or a slurry. If the initial reaction mixture is a slurry, the solvent system is usually selected so that resulting cationic copolymer is dissolved. Suitable solvents that can dissolve both the precursor copolymer as well as the cationic copolymer include N,N-dimethylformamide, N,N-dimethylacetamide. N-methyl-2-pyrrolidinone, and dimethyl sulfoxide. Suitable solvents that can dissolve the cationic copolymer but not the precursor copolymer include, but are not limited to, methanol, ethanol, 1-methoxy-2-propanol, and blends of these with toluene. The reaction mixture is often heated at an elevated temperature for at least 30 minutes, at least 1 hour, or even more. The weight percent solids are often in a range of 10 to 60 weight percent, 20 to 50 weight percent, or 20 to 40 weight percent.

With respect to monomer unit (b), in some preferred embodiments, the corresponding nitrogen-containing base is represented by the formula $(R^1)_2N-R^2-Ar^2-CH=CH_2$. Each $R^1$ independently represents an alkyl group having 1 to 4 carbon atoms (e.g., methyl, ethyl, propyl, or butyl), preferably methyl. Each $R^2$ independently represents an alkylene group having from 1 to 6 carbon atoms (e.g., methylene, ethylene, 1,3-propanediyl, 1,4-butanediyl, 1,5-pentanediyl, or 1,6-hexanediyl), preferably methylene, ethylene, or 1,3-propanediyl. In these embodiments, each $Ar^2$ independently represents an optionally substituted divalent uncharged aryl ring such as, for example: o-, m-, or p-phenylene; imidazole-1,3-diyl; 2,4,5-trimethylimidazole-1,3-diyl; 1,2-dimethylimidazole-1,3-diyl; 2,5-dimethylimidazole-1,3-diyl; or 2,4-dimethylimidazole-1,3-diyl. Generally, $Ar^2$ is selected such that it does not contain or contribute to an N—H bond. One preferred nitrogen-containing base is N,N-dimethylaminomethylstyrene (o-, m-, and p-isomers and combinations thereof).

In certain preferred embodiments (e.g., embodiments in which L is a direct bond), $Ar^2$ represents a N-vinylimidazolium group (see Formula IV, below), the corresponding nitrogen-containing base is represented by the Formula V, below.

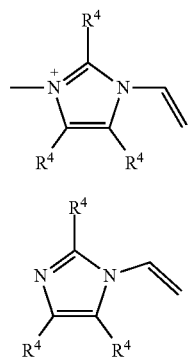

wherein $R^4$ is hydrogen or an alkyl group having from 1 to 4 carbon atoms, preferably methyl or ethyl. Examples include 1-vinylimidazole (i.e., N-vinylimidazole); 2,4,5-trimethyl-1-vinylimidazole; 2,5-dimethyl-1-vinylimidazole; and 2,4-dimethyl-1-vinylimidazole. Suitable corresponding N-vinylimidazoles may be obtained commercially or prepared by known methods, for example.

To provide monomer unit (c), the precursor copolymer can be reacted with additional nitrogen-containing bases that lack a vinyl group adjacent to an aryl ring as in monomer unit (b). For example, in some preferred embodiments, the corresponding tertiary amine is represented by the formula $(R^1)_2N-R^2-Ar^2-R^3$. Each $R^1$ independently represents an alkyl group having 1 to 4 carbon atoms (e.g., methyl, ethyl, propyl, or butyl), preferably methyl. Each $R^2$ independently represents an alkylene group having from 1 to 6 carbon atoms (e.g., methylene, ethylene, 1,3-propanediyl, 1,4-butanediyl, 1,5-pentanediyl, or 1,6-hexanediyl), preferably methylene, ethylene, or 1,3-propanediyl. Each $Ar^2$ independently represents an optionally substituted divalent aryl ring such as, for example: o-, m-, or p-phenylene; imidazole-1,3-diyl; 2,4,5-trimethylimidazole-1,3-diyl; 2,5-dimethylimidazole-1,3-diyl; or 2,4-dimethylimidazole-1,3-diyl. $Ar^2$ is generally selected such that it does not contain or contribute to an N—H bond. Each $R^3$ independently represents H or an alkyl group having 1 to 6 carbon atoms (e.g., methyl, ethyl, propyl, butyl, isobutyl, pentyl, hexyl). Generally, $R^3$ is selected such that when $R^3$ is H, it is not bonded to nitrogen.

In certain preferred embodiments (e.g., some embodiments in which L is a direct bond), the appropriate tertiary amine is represented by Formula VI, below

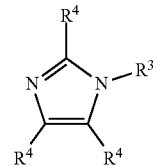

wherein $R^3$ and $R^4$ are as previously defined. Examples include 1-methylimidazole (i.e., N-methylimidazole); 1-ethylimidazole; 1-propylimidazole; 1-butylimidazole; 1-hexylimidazole; 2,4,5-trimethyl-1-methylimidazole; 2,5-dimethyl-1-methylimidazole; and 2,4-dimethyl-1-methylimidazole. Suitable corresponding imidazoles may be obtained commercially or prepared by known methods, for example.

When $Ar^2$ is a divalent optionally substituted pyridinium group it can be prepared from a corresponding pyridine of Formula VII, below.

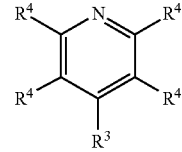

wherein $R^3$ and $R^4$ are as previously defined. Examples include pyridine; 2-, 3-, or 4-methylpyridine; 4-butylpyridine; 4-hexylpyridine; 2,4,6-trimethylpyridine; 2,4-dimethyl-pyridine; and 3,5-dimethylpyridine. Suitable corresponding pyridines may be obtained commercially or prepared by known methods, for example.

Still other suitable optional nitrogen-containing bases that can be reacted with the precursor copolymer include unsaturated heterocyclic compounds with a five-membered ring such as pyrrole, pyrazole, triazole, and tetrazole as well as unsaturated compounds with a six-membered ring such as pyrimidine, pyrazine, pyridazine, and triazine. Saturated nitrogen-containing bases such as piperidine and piperazine can also be used. Any of these compounds can be substituted with one or more alkyl groups.

Other suitable optional nitrogen-containing bases are tri-alkylamines. The alkyl groups can be linear, branched, or cyclic (depending on the number of carbon atoms) and may independently have 1 to 10 carbon atoms, preferably 1 to 4 carbon atoms. Specific examples include, but are not limited to, trimethylamine, triethylamine, ethyldimethylamine, butyldimethylamine, and diisopropylethylamine.

Still other suitable optional nitrogen-containing bases that can be reacted with the precursor copolymer include guanidine compounds that are substituted with a plurality of alkyl groups. In some embodiments, the guanidinium group is fully substituted with alkyl groups. Suitable alkyl groups often contain 1 to 10 carbon atoms, 1 to 6 carbon atoms, 1 to 4 carbon atoms, or 1 to 3 carbon atoms, and the alkyl groups can be linear, branched, or cyclic (depending on the number of carbon atoms). Examples include, but are not limited to, pentamethylguanidine, 2-tert-butyl-1,1,2,2-tetramethylguanidine, and N,N-diethyl-N,N',N'-trimethylguanidine as well as cyclic and polycyclic compounds such as 2-methylimino-1,3-dimethylimidazolidine and 7-methyl-1,5,7-triazabicyclo[4.4.0]dec-5-ene.

The various nitrogen-containing bases are used to introduce pendant nitrogen-containing groups and form monomer units (b) and (c) in the cationic copolymer. More particularly, the nitrogen-containing bases react with monomer units derived from vinylbenzyl halide in the precursor copolymer. While reacting all the available monomer units with the nitrogen-containing base may increase the total ionic conductivity, adding more positively charged groups into the cationic copolymer tends to increase its swelling and solubility in water or water-based solutions such as used in various electrolytes within electrochemical cells. While increased ionic conductivity is desirable for use in electrochemical cells, increased swelling and solubility tend to be undesirable. The mole percentage of the monomer units derived from reacted vinylbenzyl halide is often a compromise between ionic conductivity on one hand and swelling and solubility on the other hand. Typically, the total moles of the nitrogen-containing bases are selected to react with at least 60 mole percent, at least 65 mole percent, at least 70 mole percent, at least 75 mole percent, at least 80 mole percent, at least 85 mole percent and up to 100 mole percent, up to 99 mole percent, up to 97 mole percent, up to 95 mole percent, up to 90 mole percent, up to 85 mole percent, or up to 80 mole percent of the monomer units derived from vinylbenzyl chloride. Often, the total moles of the nitrogen-containing base are selected to be less than the moles of monomer units derived from vinylbenzyl halide to avoid an excess of the nitrogen-containing base present in the final product solution.

When prepared for use in an electrochemical cell, the cationic copolymer often contains 20 mole percent to 50 mole percent nitrogen-containing monomer units based on the total moles of monomer units in the cationic copolymer. These nitrogen-containing monomer units are typically cationic. If lower amounts of the nitrogen-containing monomer units (i.e., less than 20 mole percent based on the total moles of monomer units) are present, the resulting cationic copolymer may not have enough ionic conductivity. If higher amounts of the nitrogen-containing monomer units are present, however, the resulting cationic copolymer may be too soluble and/or swell too much when used as an anion exchange membrane in an electrochemical cell. The cationic copolymer can contain at least 20 mole percent, at least 25 mole percent, at least 30 mole percent, at least 35 mole percent, or at least 40 mole percent and up to 50 mole percent, up to 45 mole percent, up to 40 mole percent, up to 35 mole percent, or up to 30 mole percent cationic, nitrogen-containing monomer units. In many embodiments, all the nitrogen-containing monomer units are monomer units (b) or (c).

Monomer units (c) may comprise, on a molar basis and in any combination, at least 5 percent, at least 10 percent, at least 15 percent, at least 20 percent, at least 25 percent, at least 30 percent, at least 40 percent, or at least 50 percent and up to 100 percent, up to 95 percent, up to 90 percent, up to 80 percent, up to 70 percent, up to 60 percent, up to 50 percent, up to 40 percent, up to 30 percent, or up to 20 percent of the total of all cationic nitrogen-containing monomer units in the cationic copolymer. In some embodiments, monomer units (c) may comprise, on a molar basis 10 to 95 percent, 20 to 95 percent, 30 to 95 percent, 40 to 95 percent, 10 to 90 percent, or 10 to 80 percent, 20 to 80 percent, 30 to 80 percent, 40 to 80 percent, or 40 to 60 percent of the total of all cationic nitrogen-containing monomer units in the cationic copolymer.

Particularly when the cationic copolymer is prepared for use in an electrochemical cell, the total content of cationic, nitrogen-containing monomer units is in a range of 20 to 50 mole percent and the cationic, nitrogen-containing monomer units correspond to monomer units (b) and/or (c). The total content of cationic, nitrogen-containing monomer units may be at least 20 mole percent, at least 25 mole percent, at least 30 mole percent, or at least 35 mole percent and up to 50 mole percent, up to 45 mole percent, up to 40 mole percent, up to 35 mole percent, or up to 30 mole percent. The mole percentage amounts are based on the total number of moles of monomer unit in the cationic copolymer.

Cationic polymers according to the present disclosure contain a polymerizable vinyl group that can be polymerized by free-radical polymerization and are curable (i.e., crosslinkable), for example, to form a membrane.

Accordingly, the present disclosure also provides a curable membrane precursor composition comprising a cationic copolymer according to the present disclosure and a free-radical initiator. Useful free-radical initiators may include thermal initiators and/or photoinitiators. For rapid curing during continuous manufacturing processes photoinitiators are typically preferred. In some cases, electron beam radiation may be used to effect curing/crosslinking.

Exemplary useful thermal initiators include azo compounds such as 2,2'-azobis(isobutyronitrile), 2,2'-azobis(2,4-dimethylpentanenitrile), and 2,2'-azobis(2-methylbutyronitrile), and organic peroxides (e.g., benzoyl peroxide and lauroyl peroxide), and mixtures thereof.

Exemplary useful photoinitiators include benzoin and its derivatives such as α-methylbenzoin; α-phenylbenzoin; α-allylbenzoin; α-benzylbenzoin; benzoin ethers such as benzil dimethyl ketal, benzoin methyl ether, benzoin ethyl ether, benzoin n-butyl ether; acetophenone and its derivatives such as 2-hydroxy-2-methyl-1-phenyl-1-propanone, and 1-hydroxycyclohexyl phenyl ketone; 2-methyl-1-[4-(methylthio)phenyl]-2-(4-morpholinyl)-1-propanone; 2-benzyl-2-(dimethylamino)-1-[4-(4-morpholinyl)phenyl]-1-butanone. Other useful photoinitiators include, for example, pivaloin ethyl ether, anisoin ethyl ether, anthraquinones (e.g., anthraquinone, 2-ethylanthraquinone, 1-chloroanthraquinone, 1,4-dimethylanthraquinone, 1-methoxyanthraquinone, orbenzanthraquinone), halomethyltriazines, benzophenone and its derivatives, iodonium salts and sulfonium salts, titanium complexes such as bis ($\eta_5$-2,4-cyclopentadien-1-yl)-bis[2,6-difluoro-3-(1H-pyrrol-1-yl)phenyl]titanium; halonitrobenzenes (e.g., 4-bromomethylnitrobenzene), mono- and bis-acylphosphines, and mono- and bis-acylphosphinate esters (e.g., (2,4,6-trimethylbenzoyl)phenylphosphinic acid ethyl ester). Combinations of photoinitiators may be used. One or more spectral sensitizers (e.g., dyes) may be used in conjunction with the photoinitiator(s), for example, in order to increase sensitivity of the photoinitiator to a specific source of actinic radiation.

The amount of the free-radical initiator is typically in a range of 0.01 to 5 weight percent based on the total weight of the membrane precursor composition. The amount can be at least 0.01 weight percent, at least 0.05 weight percent, at least 0.1 weight percent, at least 0.5 weight percent, at least 1 weight percent and up to 5 weight percent, up to 4 weight percent, up to 3 weight percent, up to 2 weight percent, or up to 1 weight percent; however, higher amounts may also be used.

Useful sources of actinic radiation include, lasers, arc lamps (e.g., medium pressure mercury arc lamps), xenon flash lamps, microwave-driven lamps (e.g., equipped with H-type bulb or D-type bulb). Selection of appropriate exposure conditions will be within the capability of those skilled in the art.

Membranes made from the membrane composition may have any suitable thickness, preferably 10 to 200 micrometers. For example, the thickness can be at least 10 micrometers, at least 20 micrometers, at least 30 micrometers, at least 40 micrometers, or at least 50 micrometers and/or up to 200 micrometers or greater, up to 150 micrometers, up to 100 micrometers, or up to 50 micrometers.

In some embodiments, the anion exchange membrane may further include a reinforcement material such as a porous support. The porous support can be a woven or non-woven material made of a polymeric material such as, for example, fluoropolymers (e.g., polytetrafluoroethylene) or polyolefins (e.g., polyethylene or polypropylene), electrospun fibers, fiberglass, polymer fibers, fiber mats, perforated films, and porous ceramics. The reinforcement material can be imbibed (e.g., saturated or coated) with a liquid composition containing the cationic copolymer described herein either neat or containing solvent (e.g., dissolved in a suitable solvent), followed by removal of the solvent (if present) to embed the cationic copolymer into the pores of the reinforcement material. The porous support is generally electrically and ionically non-conductive.

Membranes according to the present disclosure are useful in various electronic devices. In some embodiments, the electronic device is an electrolyzer.

Examples of electrochemical devices include, but are not limited to, fuel cells, electrolyzers, batteries, or electrodialysis cells.

Electrode materials can include, for example, graphitic carbon, glassy carbon, titanium, or any of the following "catalytically active elements": V, Cr, Mn, Fe, Co, Ni, Cu, Zn, Sn, Zr, Nb, Mo, Ru, Rh, Pd, Ag, Cd, Hf, Ta, W, Re, Ir, Pt, Au, Hg, Al, Si, In, Tl, Pb, Bi, Sb, Te, U, Sm, Tb, La, Ce, Nd, and alloys or combinations thereof.

In one embodiment, the cathode of the electrochemical device comprises a catalytically active species comprising silver, gold, copper, nickel, iron, or combinations thereof.

In one embodiment, the anode of the electrochemical device comprises a catalytically active species comprising ruthenium, iridium, platinum, titanium, nickel, iron, cobalt, or combinations thereof.

In one embodiment, the electrochemical device is substantially free of platinum, meaning the electrodes comprise less than 0.1 weight percent, less than 0.01 weight percent or even less than 0.001 weight percent platinum based on the total weight of the electrode.

The cathode, the anode, and the membranes can be assembled each as a separate component or can be combined when the electronic device is fabricated with one or both electrodes or a portion thereof. For example, to maximize cost savings and, in some instances, performance, the individual components, or layers thereof, may be sufficiently thin, such that some of the components could act as a support during the fabrication of a thin layer. The various components or portions thereof can be laminated together, formed in situ on a surface of a component, and/or coated onto a component.

An assembly comprising the anode, cathode and anion exchange membranes can be sandwiched between two flow field plates and then held together such that each layer is in contact, preferably intimate contact with the adjacent layers.

An exemplary electrochemical device, an electrolyzer, is shown in FIG. 1. Electrolyzer 30 includes membrane electrode assembly 32 interposed between rigid flow field plates 34 and 36, typically formed of graphite or a graphite composite material. Membrane electrode assembly 32 consists of an anion exchange membrane 42 interposed between two electrodes, namely, anode 44 and cathode 46. Anode 44 and cathode 46 are typically formed of porous electrically conductive sheet material, such as carbon fiber paper, and have planar major surfaces. Electrodes 44 and 46 have a thin layer of catalyst material disposed on their major surfaces at the interface with membrane 42 to render them electrochemically active. As shown in FIG. 1, anode flow field plate 34 has at least one open faced channel 34a engraved, milled or molded in its major surface facing membrane 42. Similarly, cathode flow field plate 36 has at least one open faced channel 36a engraved, milled or molded in its major surface facing membrane 42. When assembled against the cooperating surfaces of electrodes 44 and 46, channels 34a and 36a form the reactant flow field passages for the anode reactant stream (if any) and the cathode reactant stream, respectively.

SELECT EMBODIMENTS OF THE PRESENT DISCLOSURE

In a first embodiment, the present disclosure provides a cationic copolymer comprising the divalent monomer units:

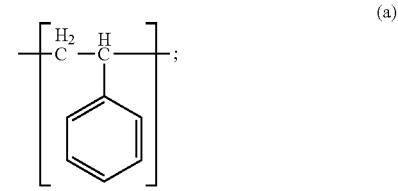

(a)

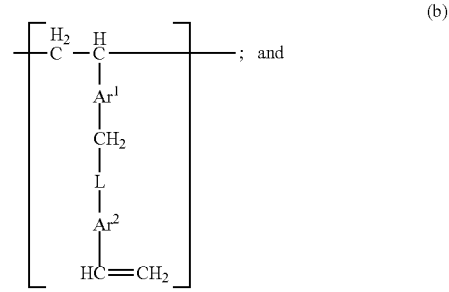

(b)

; and

13
-continued

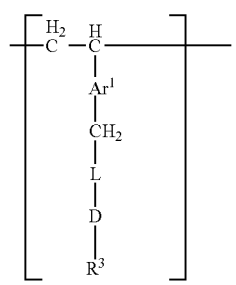

(c)

wherein:
each Ar¹ independently represents phenylene;
each L independently represents a direct bond or

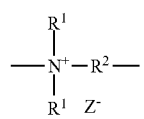

wherein each R¹ independently represents an alkyl group having 1 to 4 carbon atoms, and each R² independently represents an alkylene group having from 1 to 6 carbon atoms, and each Z⁻ represents a non-interfering monovalent anion;
each Ar² independently represents an optionally substituted divalent aryl ring, with the proviso that if L represents a direct bond, then Ar² represents an optionally substituted cationic divalent aryl ring accompanied by Z⁻;
each R³ independently represents H or an alkyl group having 1 to 6 carbon atoms; and
each D independently represents a direct bond or Ar², wherein adjacent D and L are not both direct bonds, and wherein if L is a direct bond, then D is Ar².

In a second embodiment, the present disclosure provides a cationic copolymer according to the first embodiment, wherein the ratio of moles of monomer unit a) to the sum of the moles of monomer units b) and c) is 1:1 to 4:1.

In a third embodiment, the present disclosure provides a cationic copolymer according to the first or second embodiment, wherein, for at least some of monomer units b), at least some Ar¹ are p-phenylene.

In a fourth embodiment, the present disclosure provides a cationic copolymer according to any of the first to third embodiments, wherein, for at least some of monomer units b), L is a direct bond and Ar² is represented by

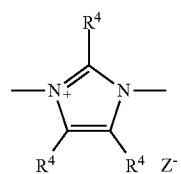

wherein each R⁴ independently represents hydrogen or an alkyl group having from 1 to 4 carbon atoms and each Z⁻ independently represents a non-interfering anion.

In a fifth embodiment, the present disclosure provides a cationic copolymer according to any of the first to fourth embodiments, wherein, for at least some of monomer units b), each L independently represents

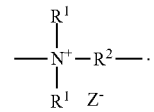

In a sixth embodiment, the present disclosure provides a cationic copolymer according to the fifth embodiment, wherein each R is methyl, R² is methylene and Ar² is phenylene.

In a seventh embodiment, the present disclosure provides a cationic copolymer according to the sixth embodiment, wherein Ar² is p-phenylene.

In an eighth embodiment, the present disclosure provides a curable membrane precursor composition comprising:
  i) a cationic copolymer according to any of the first to third embodiments; and
  ii) a free-radical initiator.

In a ninth embodiment, the present disclosure provides a curable membrane precursor composition comprising:
  i) a cationic copolymer according to the fourth embodiment; and
  ii) a free-radical initiator.

In a tenth embodiment, the present disclosure provides a curable membrane precursor composition comprising:
  i) a cationic copolymer according to the fifth or sixth embodiment; and
  ii) a free-radical initiator.

In an eleventh embodiment, the present disclosure provides a membrane composition comprising an at least partially cured curable membrane composition according to the eighth to tenth embodiments.

In a twelfth embodiment, the present disclosure provides an electrochemical device comprising:
  an anode;
  a cathode; and
  a membrane positioned between the anode and cathode, wherein the membrane comprises a membrane composition according to the eleventh embodiment.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight. Table 1, below, lists materials and abbreviations used in the Examples.

TABLE 1

| MATERIAL | ABBREVIATION | SOURCE |
| --- | --- | --- |
| tetramethylimidazole | TMIM | TCI America, Portland, Oregon |
| N-vinylimidazole | Vinyl IM | Alfa Aesar, Ward Hill, Massachusetts |
| N,N-dimethylaminomethylstyrene, mixture of isomers | DMAMS | Sigma-Aldrich Corp., Saint Louis, Missouri |
| 1-methoxy-2-propanol | MP | Alfa Aesar |
| 2,4,6-trimethylbenzoylphenyl-phosphinic acid ethyl ester | TPO-L | photoinitiator, obtained as TPO-L from BASF Corp. Florham Park, New Jersey |
| 1N Potassium hydroxide solution with less than 1 ppm metals | 1M KOH solution | VWR BDH Chemicals, Radnor, Pennsylvania |
| styrene | styrene | Sigma-Aldrich Corp. |
| vinylbenzyl chloride | VBC | obtained as vinylbenzyl chloride, mixture of isomers, from Dow Chemical Co., Midland, Michigan |
| chlorobenzene | chlorobenzene | Alfa Aesar |
| azobis(isobutyronitrile) | AIBN | thermal initiator, Sigma-Aldrich Corp. |
| methanol | MeOH | J. T. Baker Avantor Performance Materials, Center Valley, Pennsylvania |
| ethyl acetate | EtOAc | VWR BDH Chemicals |
| acetonitrile | AcCN | Omnisolv/EMD Millipore, Billerica, Massachusetts |
| deuterated chloroform | $CDCl_3$ | Cambridge Isotope Laboratories, Inc., Andover, Massachusetts |
| deuterated acetonitrile | $CD_3CN$ | Cambridge Isotope Laboratories, Inc. |

Example 1

Preparation of Polymer 1

A 1-liter glass amber bottle was charged with 170 g of styrene, 141.2 g of VBC, 244.4 g of chlorobenzene, and 2.92 g of AIBN. The mixture was shaken to dissolve the AIBN, then sparged with nitrogen at room temperature for 4 minutes. The bottle was then sealed and placed in an agitated water bath at 60° C., for 48 hr. The resulting viscous polymer solution (450.2 g) was poured into 2500 ml methanol under mechanical stirring to precipitate the polymer solid. The solid was given a total of four washes with methanol, then allowed to dry under a gentle nitrogen stream at room temperature. This yielded 235 g solid. $^1$H NMR analysis in $CDCl_3$ showed a styrene/VBC monomer unit molar ratio of 64.1/35.9 and a total residual monomer content of 0.5 mole percent.

A 25.0 g portion of the above copolymer, 8.02 g of TMIm (TMIm/VBC molar ratio=0.874) and 68.16 g of methoxypropanol were charged to a 250 mL 3-necked round bottom flask equipped with magnetic stirring and oil bath heat. The mixture was stirred for 3 hr at 75° C., then 0.55 g of DMAMS DMAMS (DMAMS/VBC ratio=0.046) was added via pipette. The mixture was allowed to stir at 75° C. for another 5 hr. The clear reaction mixture was allowed to cool, then the ionomer was isolated by pouring about 15-20 ml of the product solution into 500 ml ethyl acetate in a I-liter conical flask equipped with magnetic stirring. The mixture was stirred overnight at room temperature, then the solids allowed to settle, and the solvent was decanted off. The ionomer was given two more washes with ethyl acetate, then isolated and allowed to dry under a nitrogen stream at room temperature. The resulting powder was analyzed by $^1$H NMR in $d_3$-acetonitrile solution and showed a composition having a 63.4/29.3/1.5/5.8 mole ratio of styrene/VBTMImCl/VBDMAMSCl/VBC monomer units, respectively, wherein VBTMImCl refers to the quaternary ammonium salt adduct of a VBC monomer unit and TMIm (vinylbenzyltetranethylimidazolium chloride), and VBDMAMS refers to the quaternary ammonium salt adduct of a VBC monomer unit and DMAMS. The product was diluted to 33 weight percent in methoxypropanol to give a clear, viscous solution.

Example 2

Preparation of Polymer 2

A 250-mL two-necked round bottom flask equipped with magnetic stirring, an oil bath heating, and an inlet tube for nitrogen blanketing was charged with 25.5 g of TMIm and 26.36 g of acetonitrile. Swirling the flask produced endothermic dissolution of the solid. When the endotherm had subsided, 36.0 g of VBC was added, turning the reaction mixture bright yellow. The flask was heated 60° C., at using an oil bath, with stirring as 300 rpm, for 18 hours leaving a light amber, clear reaction mixture. Analysis by $^1$H NMR in $d_3$-acetonitrile solution showed an 88:12 (molar) monomer unit ratio of VBTMImCl and unreacted VBC, with about 2 mol % unreacted tetramethylimidazole. This mixture (42.01 g), 29.14 g styrene, 45.9 g MP, and 0.59 g AIBN were charged to an 8 oz amber glass screw top bottle. After capping and shaking to dissolve the reagents and leave a clear homogeneous solution, the mixture was sparged with nitrogen at room temperature for 2 min, then capped and sealed and placed in a forced-air oven at 60° C., on a roller at 20 rpm for 72 hr. This gave a clear, viscous polymer solution. The solution was added to ethyl acetate to precipitate the ionomer as a solid which was isolated, given a total of two washes with ethyl acetate, and dried under a nitrogen stream at room temperature. $^1$H NMR analysis of the precipitated and washed ionomer in d-acetonitrile solution gave the composition as 71.0/24.8/4.2 mole ratio of styrene/VBTMImCl/VBC, respectively.

A 22.75 g portion of the above polymer solution was mixed with 9.75 g MP and 0.51 g DMAMS in a 40 ml glass screw-top vial. The vial was heated in a forced-air oven at 60° C., for 16 hr, then allowed to cool. NMR analysis (d$_7$-acetonitrile solution) of a small sample of the ionomer powder isolated by precipitation and washing in ethyl acetate using the above procedures showed that most of the residual VBC monomer units in the starting polymer had reacted with DMAMS. The molar composition of the DMAMS-modified ionomer was estimated to be 70.6/26.5/2.34/0.5 mole ratio of styrene/VBTMImCl/VBDMAMSCl/VBC, respectively, with benzylated DMAMS units representing 8.1 mole percent of the total cationic units in the ionomer. A portion of the precipitated and washed DMAMS-modified ionomer was diluted to 35 weight percent solids with MP to give, after roller mixing overnight at room temperature, a solution for use in coating experiments.

Example 3

Preparation of Polymer 3

A sample of styrene/vinylbenzyl chloride (S/VBC) copolymer was prepared according to methods given above, utilizing treatment of a 64/36 molar mixture of styrene with 0.94 weight percent of AIBN at 56 weight percent solids in chlorobenzene, purging with nitrogen, and heating and stirring at 60° C., for 24 hr. The viscous product solution was allowed to cool to room temperature, then added slowly to an excess of methanol with vigorous stirring to precipitate the polymer. The recovered solid was washed with fresh methanol and oven dried to yield a white powder. $^1$H NMR analysis in deuterated chloroform showed S/VBC molar ratio 61.6/38.4 with residual monomer content (S+VBC) 1.7 mole percent.

In a 3-necked round-bottomed 250 ml flask equipped with oil bath heat and magnetic stirring were placed 100 g MP, 11.43 g (92 mmole) TMIM, 0.6 g potassium iodide (added as an alkylation catalyst), and 0.96 g (10.2 mmole) N-vinylimidazole. The mixture was stirred in an oil bath at 75° C. until all solids had dissolved, then 36.7 g S/VBC copolymer prepared above was added as a powder. Stirring and heating were continued. After 30 min the ball of swollen polymer had broken up and dissolved, leaving a cloudy solution. Stirring and heating were continued for about 27 hrs, at which time the flask was removed from the oil bath and allowed to cool. The reaction mixture was a clear, mobile, light yellow liquid with solids content 33 weight percent. An aliquot of a few drops was removed via glass pipette and transferred into a small glass vial which was put in a vacuum desiccator overnight at room temperature to remove solvent. This left a clear, glassy residue, which was dissolved in do-DMSO for analysis by proton NMR. The resulting spectrum showed that 75 mole percent of the chloromethyl groups in the starting copolymer had been converted to imidazolium chloride units, and N-vinylimidazolium represented 8.0 mole percent of the total imidazolium content.

Example 4

Thermal Crosslinking of Polymer 3

A glass screw-top vial was charged with 5 g polymer 3 solution and 0.79 g 4.5 weight percent of AIBN in MP solution. This corresponded to 2.2 weight percent of AIBN based on ionomer solids. Also prepared was a control sample vial containing 5 g of polymer 3 solution with no AIBN. Vials were wired together using a wire tie and suspended in an oil bath at 75° C. Samples were checked after 90 mins, and the AIBN-containing sample was found to have gelled while the control was still fluid and had undergone no visibly significant change in viscosity.

Examples 5-7

Membranes were prepared using a BYK BYKO-drive automatic applicator to coat 30-35 weight percent solids crosslinkable copolymer solutions prepared in Examples 5-7 onto a release liner with a polyethylene terephthalate backing coated with an acrylic-based release layer as described in U.S. Pat. No. 7,816,477 (Suwa et al.). Membranes were coated using a BYKO-drive automatic applicator (BYK-Gardner GmbH, Geretsried, Germany) at a speed setting of 1 inch/sec (2.54 cm/sec) and with a notch bar applicator having a 10 mil (0.01 inch, 0.254 mm) gap, and then dried in a forced air oven at 80° C., for 30 minutes. Measured dry coating thicknesses were in the range of 45-52 microns.

Examples 8 and 9

UV Crosslinking of Membranes

Solutions of curable membrane compositions were modified by addition of 1 weight percent (based on polymer solids) of TPO-L photoinitiator with stirring to dissolve the initiator. Membranes were then prepared as described above. After the drying step, membranes were passed through a Light Hammer (LHC10 Mark 2) UV processor (Fusion UV Systems Inc., Gaithersburg, Maryland) using a "D-bulb" with three passes of the conveyor belt running at 50 feet per minute (15 meters per minute) under a nitrogen atmosphere (total UV dose approximately 3 J/cm$^2$). After cure, clear solid coatings were obtained. Results are reported in Table 2, below.

Example 10

Thermal Cross-Linking of Membrane

Solutions of curable membrane compositions were modified by addition of 2 weight percent (based on polymer solids) of AIBN with stirring to dissolve. Membranes were then prepared as described above. After cure, clear solid coatings were obtained. Results are reported in Table 2, below.

TABLE 2

| COPOLYMER | MEASURED COMPOSITION (moles vinyl/ total moles cationic units) | IEC (mmol/g) | MEMBRANE | CURE CONDITION |
|---|---|---|---|---|
| 1 | 5.8% DMAMS | 1.86 | Example 5 | uncured |
|   |   |   | Example 8 | UV cured |
| 2 | 8.1% DMAMS | 1.87 | Example 6 | uncured |
|   |   |   | Example 9 | UV cured |

TABLE 2-continued

| COPOLYMER | MEASURED COMPOSITION (moles vinyl/ total moles cationic units) | IEC (mmol/g) | MEMBRANE | CURE CONDITION |
|---|---|---|---|---|
| 3 | 8.0% Vinyl IM | 1.82 | Example 7 | uncured |
|   |   |   | Example 10 | thermally cured |

Tensile Properties of Membranes

The tensile stress-strain behavior of membranes was examined at a constant strain rate of 2 mm/second. Samples were soaked in aqueous 1M KOH solution for 24 hours at room temperature, thoroughly washed with deionized water, cut into 1.00 cm×4.00 cm strips, and tested in a fully hydrated state using a TA.XTPlus Texture Analyzer (Texture Technologies. Hamilton, Massachusetts). Dimensional swell values were obtained by measuring the x/y/z dimensions of the membranes before and after the aqueous KOH soak, and calculating percent changes. Results are reported in Table 3, below.

TABLE 4

| MEMBRANE | IONIC CONDUCTIVITY IN Cl⁻ FORM, (mS/cm) |
|---|---|
| Example 5 | 20.9 |
| Example 8 | 20.3 |
| Example 6 | 19.5 |
| Example 9 | 10.0 |
| Example 7 | 20.9 |

TABLE 3

| MEMBRANE | ELONGATION AT BREAK, % | STRESS AT BREAK, MPa | MODULUS, MPa | DIMENSIONAL SWELL (X, Y), percent | DIMENSIONAL SWELL (Z), percent |
|---|---|---|---|---|---|
| Example 5 | 47 | 2.2 | 18 | 30 | 40 |
| Example 8 | 51 | 2.7 | 18 | 24 | 36 |
| Example 6 | 48 | 3.9 | 49 | 25 | 49 |
| Example 9 | 52 | 5.7 | 69 | 22 | 26 |
| Example 7 | 67 | 3.3 | 20 | 26 | 29 |
| Example 10 | 62 | 3.7 | 28 | 25 | 31 |

Successful cross-linking was demonstrated by improvements in mechanical properties vs. non-cross-linked analogs (see Table 3). Increased stress at break values were demonstrated for UV-cured membranes (Examples 8 and 9) versus analogous membranes that had not been exposed to UV (Examples 5 and 6), and increased stress at break values were demonstrated for thermally-cured membrane Example 10) versus an analogous membrane that had not been exposed to thermal cure conditions (Example 7).

Ionic Conductivity of Membranes

Ionic conductivity was measured using a 4-probe Bekk-Tech BT-110 conductivity clamp (Scribner Associates, Inc., Southern Pines, North Carolina) and a VMP3 Multi-channel potentiostat (Bio-Logic Science Instruments, Seyssinet-Pariset, France). A dry membrane sample in the chloride form (1.40 cm×4.00 cm) was assembled under two platinum wires, and the clamp was immersed into 18 megaohms deionized water for 2 hours before measurement to hydrate and swell the membrane. A current-voltage curve was recorded by applying a linear voltage sweep from an open circuit voltage (OCV) to 0.3 V first, then to −0.3 V, and finally back to OCV at 10 mV/second scan rate. Ionic conductivity was calculated from the slope of the resulting current-voltage curve using the measured dry membrane size and thickness, and an ionic conductivity clamp constant of 0.425 cm. Results are reported in Table 4, below.

Results in Table 4 show that conductivity was maintained in UV-crosslinked membranes Examples 8 and 9 as compared to analogous non-crosslinked membranes of Examples 5-7.

The preceding description, given in order to enable one of ordinary skill in the art to practice the claimed disclosure, is not to be construed as limiting the scope of the disclosure, which is defined by the claims and all equivalents thereto.

What is claimed is:

1. A cationic copolymer comprising the divalent monomer units:

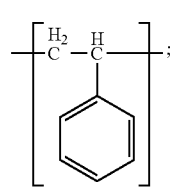

(a)

-continued

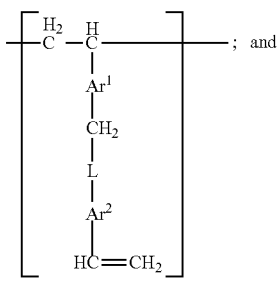
; and

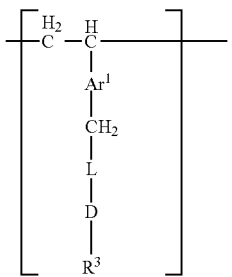

wherein:
each Ar¹ independently represents phenylene;
each L independently represents a direct bond or

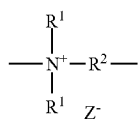

wherein each R¹ independently represents an alkyl group having 1 to 4 carbon atoms, and each R² independently represents an alkylene group having from 1 to 6 carbon atoms, and each Z– represents a non-interfering monovalent anion;
each Ar² independently represents an optionally substituted divalent aryl ring, with the proviso that if L represents a direct bond, then Ar² represents an optionally substituted cationic divalent aryl ring accompanied by Z–;
each R³ represents a methyl group; and
each D independently represents a direct bond or the group represented by

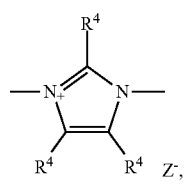

wherein each R⁴ is methyl, Z– represents a non-interfering monovalent anion, adjacent D and L are not both direct bonds, and wherein if L is a direct bond, then D is the group represented by

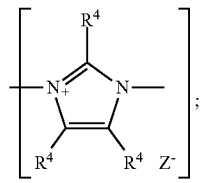

wherein the ratio of moles of monomer unit a) to the sum of the moles of monomer units b) and c) is 1:1 to 4:1, wherein for at least some of monomer units b), at least some Ar¹ are p-phenylene and wherein, for at least some of monomer units b), each L independently represents

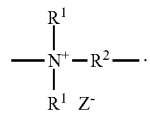

2. The cationic copolymer of claim 1, wherein each R¹ is methyl, R² is methylene and Ar² is phenylene.

3. The cationic copolymer of claim 2, wherein Ar² is p-phenylene.

4. A curable membrane precursor composition comprising:
i) the cationic copolymer of claim 2; and
ii) a free-radical initiator.

5. A membrane composition comprising an at least partially cured curable membrane composition according to claim 4.

6. A curable membrane precursor composition comprising:
i) the cationic copolymer of claim 1; and
ii) a free-radical initiator.

7. A membrane composition comprising an at least partially cured curable membrane composition according to claim 6.

8. An electrochemical device comprising:
an anode;
a cathode; and
a membrane positioned between the anode and cathode, wherein the membrane comprises the membrane composition of claim 7.

9. A membrane composition comprising an at least partially cured curable membrane composition according to claim 1.

* * * * *